Aug. 11, 1942.  C. H. BRIGGS  2,292,606
NONGLARE ATTACHMENT FOR REAR VIEW MIRRORS
Filed July 1, 1940

INVENTOR.
CLIFTON H. BRIGGS
BY
ATTORNEYS

Patented Aug. 11, 1942

2,292,606

UNITED STATES PATENT OFFICE 2,292,606

NONGLARE ATTACHMENT FOR REAR VIEW MIRRORS

Clifton H. Briggs, Miami Beach, Fla.

Application July 1, 1940, Serial No. 343,500

8 Claims. (Cl. 88—77)

The invention relates generally to non-glare mirrors and refers more particularly to nonglare mirror attachments for the usual or ordinary rear view mirrors of motor vehicles.

One of the essential objects of the invention is to provide an attachment of this type having opaque or black glass to absorb rays of light, especially the glare of headlights of other motor vehicles, so that the dazzling effect of the bright lights and resultant eye strain will be dispensed with entirely.

Another object is to provide an attachment that may be easily and quickly applied to the ordinary rear view mirror whenever desired, for instance, while driving at night, and may be similarly applied to another accessory of the vehicle such as the usual sun visor when not in use, for example, while driving during the daytime.

Another object is to provide an attachment wherein the means for holding the opaque glass upon the usual mirror preferably includes a backing for the glass having means for supporting the glass in surface-to-surface relation upon the mirror and for preventing the glass from moving edgewise of the mirror.

Another object is to provide an attachment wherein the backing and means mentioned are encased or covered with a suitable sound deadening non-skid material that also eliminates scratching or marring of the mirror to which the attachment is applied.

Another object is to provide an attachment that may be applied to mirror edges of various configuration.

Another object is to provide an attachment wherein the supporting means aforesaid is capable of being re-shaped or bent for adjustment purposes.

Another object is to provide an attachment that is simple in construction and economical to manufacture.

Other objects, advantages and novel details of construction of this invention will be made more apparent as this description proceeds, especially when considered in connection with the accompanying drawing, wherein.

Figure 1:
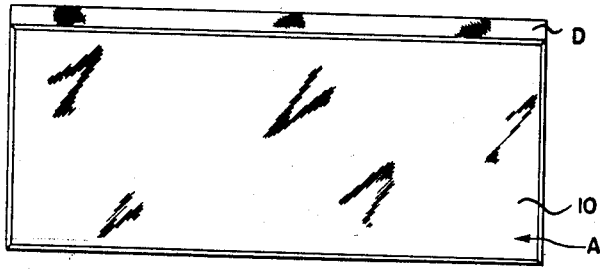
Figure 1 is a front elevation of an attachment embodying my invention.
Figure 2:
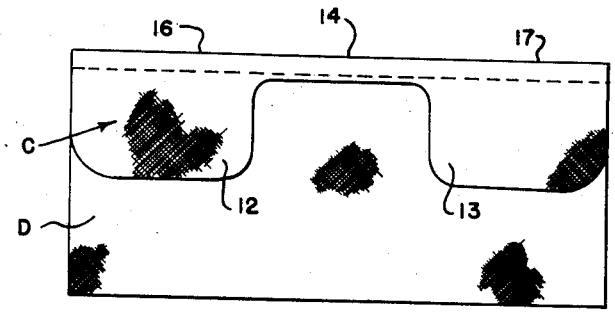
Figure 2 is a rear elevation thereof.
Figure 5:
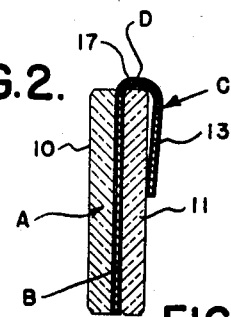
Figure 5 is a vertical sectional view taken substantially on the line 5—5 of Figure 4.
Figure 3:
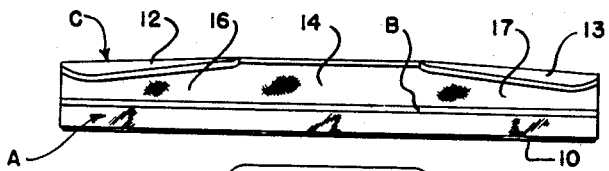
Figure 3 is an edge elevation thereof.

Referring to the drawing, A is the body, B is the backing, and C is the supporting means of an attachment embodying my invention.

As shown, the body A is formed of opaque or black glass and has a polished surface 10. Such body may be any size or shape desired according to whether it is used upon the mirror of an automobile, truck or tractor. In the present instance it is substantially rectangular-shape for use upon a similarly shaped glass 11 of a rear view mirror of an automobile.

The backing B and supporting means C are preferably formed from a single sheet of metal such as galvanized iron and are upon the rear of the body A. As shown, the backing B comprises a substantially flat sheet substantially equal in area to the back of the body A, while the supporting means C is at the upper edge of the backing and preferably comprises the hooks 12 and 13 at opposite ends of said edge, and the intermediate lateral flange 14. Any suitable means such as cement, shellac or the like may be used to secure the backing B to the unpolished back of the body A.

Figure 4:
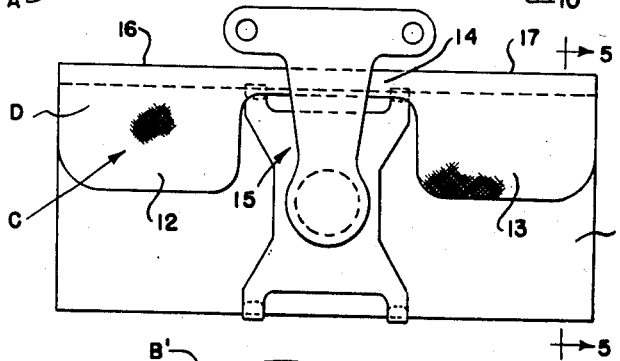
Figure 4 is a rear elevation of an ordinary rear view mirror and showing my attachment applied thereto.

By referring to Figure 4 it will be noted that the hooks 12 and 13 straddle the mounting 15 for the glass 11 of the rear view mirror and taper lengthwise from their inner to their outer ends for proper non-sliding gripping engagement with the glass 11 of the rear view mirror. Inasmuch as the hooks 12 and 13 are formed of sheet metal, they may be bent as desired for adjustment purposes. Moreover, as they are tapered the hooks 12 and 13 may engage and grip properly glass 11 of various thickness and contour. The intermediate flange 14 constitutes an endwise extension of the arches 16 and 17 of the hooks and is adapted to seat upon the upper edge of the glass 11 of the rear view mirror.

To assist the hooks 12 and 13 to firmly grasp the glass 11 of the rear view mirror and at the same time to prevent objectionable noise when the attachment is applied to a rear view mirror, the backing B and supporting means C are preferably encased or covered with felt, cloth, fibre, or other suitable sound deadening, non-skid material D. As shown, this material is secured in surface-to-surface relation to the backing B, hooks 12 and 13 and lateral flange 14. Moreover, it absorbs some of the cement, shellac, etc., used as fastening means between the backing B and body A and therefore cooperates to provide a good connection between such parts. This material D also covers and conceals the edges and corners of the backing B and fastening means and therefore not only shields and improves the appearance thereof but protects the user from such metal parts.

Figure 6:
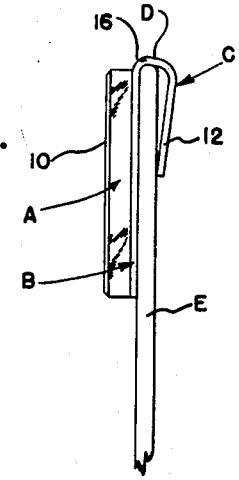
Figure 6 is an end elevation of the attachment applied to a sun visor.

In use, the attachment may be applied to the glass 11 of the usual rear view mirror as illustrated in Figure 4. This may be easily accomplished by merely slipping the hooks 12 and 13 over the upper edge of the glass 11. In this position the opaque body will cover the glass 11 so as to absorb the light rays projected toward the mirror by the headlights of other vehicles and thus will serve as a non-glare mirror. The covering material D will serve as a sound deadener and will cooperate with the supporting means C of the attachment to prevent it from slipping relative to the glass 11 of the rear view mirror. When not in use, for example, during daytime driving, the attachment may be applied to one of the usual sun visors such as E of the vehicle by merely slipping the hooks 12 and 13 over an edge thereof as illustrated in Figure 6. Thus, the attachment is always available and ready for use whenever desired.

Figure 7:
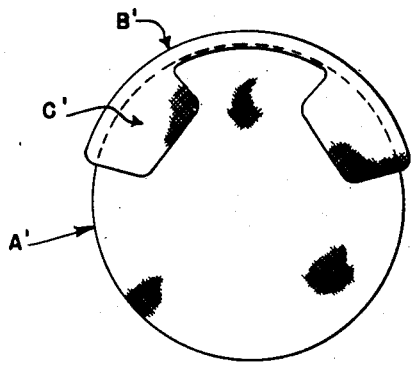
Figure 7 is a rear elevation of a slight modification.

In Figure 7 I have illustrated a slight modification wherein the body A' is circular to shield the usual circular mirror (not shown) of a truck, tractor, or the like, and the backing B' and supporting means C' are correspondingly curved to adapt the attachment for such circular mirror mounting. Other than this, the structure is the same as in Figures 1 to 6, inclusive.

What I claim as my invention is:

1. A non-glare attachment for a rear view mirror, comprising an opaque body for concealing said mirror, supporting means for the body including a backing for the body united in surface-to-surface relation to the back of the body and having means for embracing an edge of the mirror, and a sound deadening non-skid material covering the exposed portions of the backing and embracing means.

2. A non-glare attachment for a rear view mirror, comprising an opaque body for concealing said mirror, and supporting means for the body including a metal backing secured in surface-to-surface relation to the back of the body and provided at its upper edge with extensions for embracing the upper edge of the mirror, and a sound deadening non-skid material covering the exposed portions of the backing and extensions.

3. A non-glare attachment for a rear view mirror, comprising a body of opaque or black glass adapted to cover the front surface of the glass of a rear view mirror, and means for detachably holding said body in place including a fabric covered metal stamping secured in surface-to-surface relation to the back of said body and having spaced inverted L-shaped extensions thereof for engagement with the upper edge and back of the glass of the mirror.

4. A non-glare attachment for a rear view mirror, comprising a body of opaque or black glass adapted to cover the front face of the glass of a rear view mirror, a metal stamping having a substantially flat portion upon the back of the body and provided at spaced points longitudinally of the flat portion with open return-bent portions for embracing the upper edge of the glass of the mirror, a fabric envelop for the stamping disposed in surface-to-surface relation against and concealing the flat portion and open return-bent portions, and adhesive material between and bonding firmly together the fabric on the flat portion of the stamping and the back of said opaque body.

5. A non-glare attachment for a rear view mirror, comprising a plate-like body of opaque material of sufficient area to cover one face of an ordinary rear view mirror, and means for supporting said body upon the face of said mirror, including a sheet of metal rigidly secured in surface-to-surface relation to the back of said body and adapted to engage in surface-to-surface relation the face aforesaid of the mirror, said sheet being provided at spaced points of its upper edge with open return-bent portions for hooking over the upper edge of the mirror, and a fabric covering secured in surface-to-surface relation to the exposed parts of said sheet and return-bent portions.

6. A non-glare attachment for a rear view mirror, comprising a plate-like body of opaque material of sufficient area to cover one face of an ordinary rear view mirror, and means for supporting said body upon the face of said mirror, including a sheet of metal rigidly secured in surface-to-surface relation to the back of said body and adapted to engage in surface-to-surface relation the face aforesaid of the mirror, said sheet being provided at spaced points of its upper edge with open return-bent portions for hooking over the upper edge of the mirror, and a covering of relatively soft sound deadening non-skid material secured in surface-to-surface relation to the exposed parts of said sheet and return-bent portions.

7. A non-glare attachment for a rear view mirror, comprising a plate-like body of opaque material of sufficient area to cover one face of an ordinary rear view mirror, and means for supporting said body upon the face of said mirror, including a sheet of metal disposed in surface-to-surface relation upon the back of said body and provided at the upper edge thereof with an open return-bent portion for hooking over the upper edge of said mirror, an adhesive between and uniting the sheet and plate-like body, and a fabric envelope for the plate and return-bent portions, a part of said envelope being between the sheet and plate-like body and absorbing some of the adhesive aforesaid.

8. A non-glare attachment for a reaw view mirror, comprising a plate-like body of opaque material, and a one-piece support for said body comprising a plate-like member rigidly secured in surface-to-surface relation to the back of said body, said plate-like member being provided at spaced points longitudinally of the opaque body with open return-bent portions for hooking over the upper edge of the mirror and provided intermediate said open return-bent portions with a lateral flange for seating engagement with the upper edge of said mirror.

CLIFTON H. BRIGGS.